United States Patent [19]
Medina

[11] Patent Number: 4,723,844
[45] Date of Patent: Feb. 9, 1988

[54] EYEGLASSES
[75] Inventor: George Medina, Miami, Fla.
[73] Assignee: Invisible Eyewear, Inc., Miami Beach, Fla.
[21] Appl. No.: 843,620
[22] Filed: Mar. 25, 1986
[51] Int. Cl.$^4$ ............................................... G02C 5/14
[52] U.S. Cl. ..................................... 351/111; 351/114
[58] Field of Search ......................... 351/110, 111, 114
[56] References Cited
U.S. PATENT DOCUMENTS
4,202,609  5/1980  Reese ................................. 351/111

*Primary Examiner*—John K. Corbin
*Assistant Examiner*—P. M. Dzierzynski
*Attorney, Agent, or Firm*—Bachman & LaPointe

[57] ABSTRACT

The eyeglasses include a first and second transparent member affixed to an intermediate nose portion wherein the desired plane of the transparent member-nose portion combination can be readily altered by moving the transparent members. First and second suspension lines are affixed to the first and second transparent members and threadedly engage first and second earpieces.

6 Claims, 3 Drawing Figures

EYEGLASSES

BACKGROUND OF THE INVENTION

It is desirable to provide rimless type eyeglasses which are not readily visible, including the temple mountings between the transparent members and the user's ears, in order to achieve a desirable aesthetic effect.

At the same time it is desirable to provide a light-weight unit in order to achieve maximum user comfort.

Heretofore, plastic ophthalmic lenses, rimless mountings and light weight temple mountings have been used in order to attempt to achieve these goals; however, the resultant units are not entirely successful.

It is also desirable to provide a unit which will permit variation in alignment with respect to a user's eyes in order to avoid the necessity for the user to move and hold the transparent members in a desired re-orientation. Thus, conventionally eyeglasses are assembled in a fixed plane in front of a person's eyes so that re-orientation in a different plane is not possible without moving and holding the entire assembly or lifting or lowering the head into awkward positions. The latter is especially uncomfortable with bifocals or trifocals. It is naturally desirable to develop an assembly which permits such variation in alignment by simply moving the transparent members maintaining such re-alignment without the necessity for holding the assembly in position, and accomplishing this while leaving the head of the user in a fixed position.

U.S. Pat. No. 4,202,609 by Reese, patented May 13, 1980 provides suspension eyewear made of a pair of ophthalmic lenses or eyepieces attached to a metal centerpiece, such as the type used in rimless eyeglasses known as three-piece-mountings. Two small, flexible suspension lines are attached near the outer edge of each lens at points sufficiently separated to control the plane of the front assembly to the face, and to provide stability. The lines then converge just forward of the crus helicis where they enter a device which permits a controlled, precise adjustment of the length of the lines, individually. An earwire entends from the device, over and behind the ear to below the mastoid. However, the orientation of the eyewear of the '609 patent is fixed with relation to the eyes of the user and variation of the orientation is no simpler than with conventional units. Moreover, the fixed metal centerpiece of the '609 patent renders such re-orientation impractical.

Accordingly, it is a principal object of the present invention to provide light-weight, rimless type eyeglasses which are not readily visible.

It is a further object of the present invention to provide such eyeglasses which permit variation in alignment with respect to the user's eyes without the eyeglasses automatically returning to one optimal position.

Further objects and advantages of the present invention will appear hereinbelow.

SUMMARY OF THE INVENTION

In accordance with the present invention it has now been found that the foregoing objects and advantages can be readily obtained. The eyeglasses of the present invention comprise: a nosepiece, preferably a one-piece, plastic nosepiece; a first and second transparent member affixed to the nosepiece on opposite sides thereof to form a transparent member-nosepiece combination adapted to be disposed in a desired plane in front of a person's eyes; a first and second earpiece configured to be positioned over and behind a respective ear of the person; a first suspension line having the ends thereof attached to said first transparent member at spaced apart points and threadedly engaging said first earpiece; and a second suspension line having the ends thereof attached to said second transparent member at spaced apart points and threadedly engaging said second earpiece, wherein the desired plane of the transparent member-nosepiece combination can be fixedly altered by moving the transparent members and by changing the distance, from the transparent members to the earpieces of each suspension line.

The eyeglasses of the present invention readily achieve the foregoing objectives. They are light-weight and nearly invisible to provide a comfortable fit and an aesthetically pleasing appearance. In addition, the plane of the transparent member-nosepiece combination can be readily fixedly altered by simply the transparent members. This results in the eyeglasses remaining in their re-oriented position even when one's hands are removed from the transparent members without the lenses automatically returning to their original position. Naturally, the original position may easily be achieved by simply moving the combination back to the original position which will be automatically retained. The ability to fixedly retain re-orientation is due to the threaded engagement with the earpiece and enables maximum flexibility in use.

BRIEF DESCRIPTION OF THE DRAWINGS

The present invention may be more readily understood from a consideration of the following representative drawings wherein.

DETAILED DESCRIPTION

Figure 1:
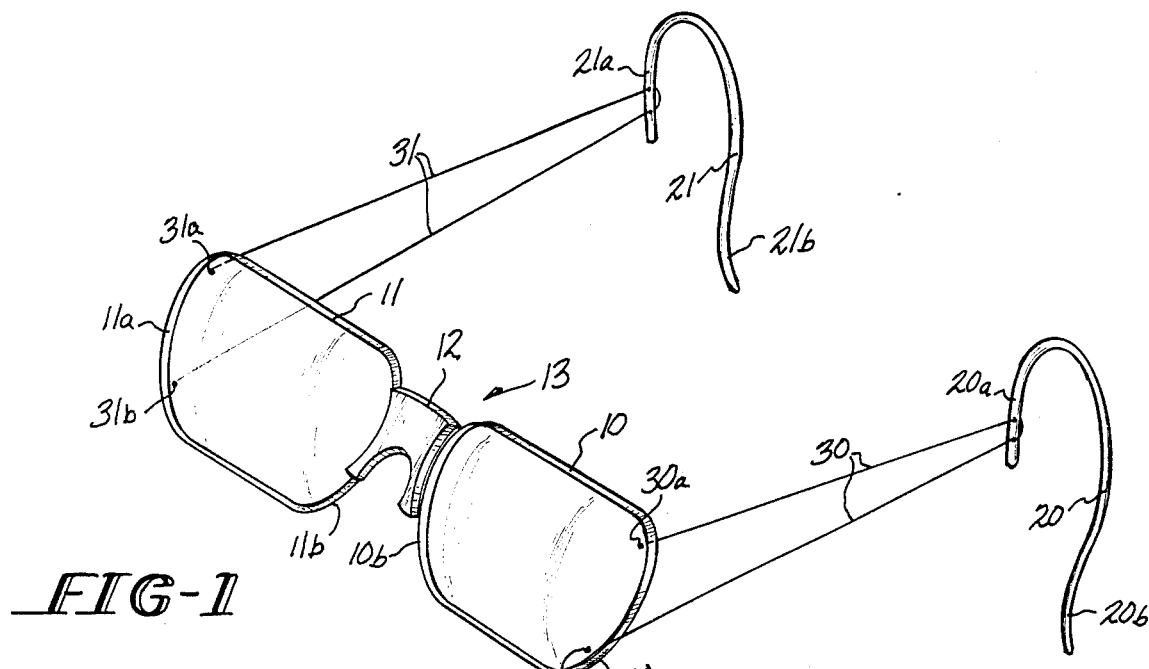
FIG. 1 is a perspective view of the eyeglass of the present invention.
Figure 2:
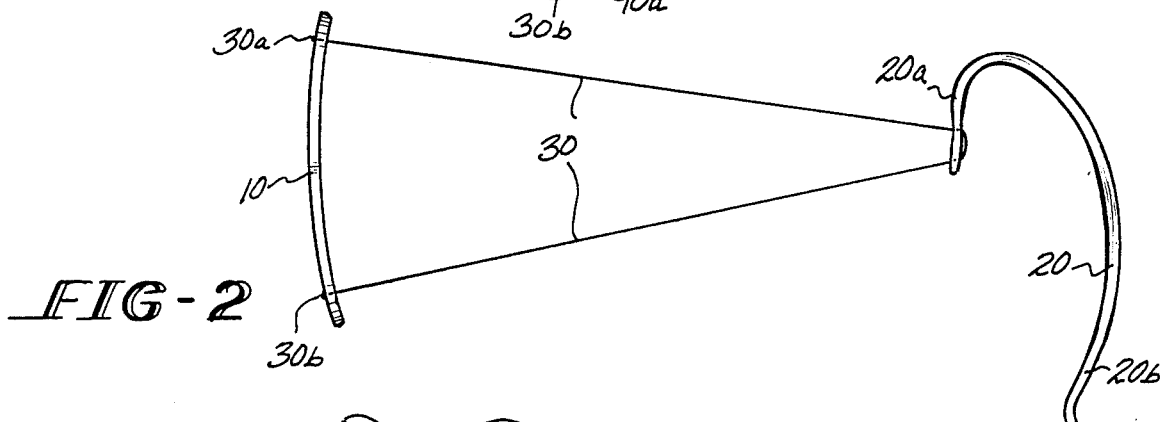
FIG. 2 is a side elevation of the eyeglasses of FIG. 1 showing one earpiece, one transparent member and the suspension line.
Figure 3:
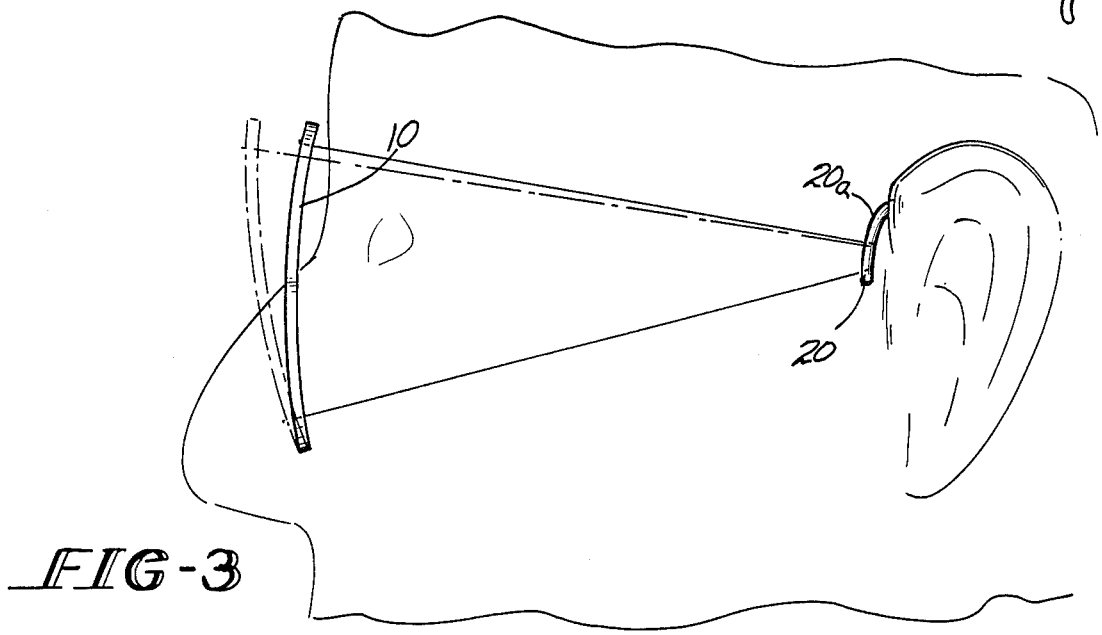
FIG. 3 is a side elevation showing the eyeglasses of FIG. 1 on a user with the re-oriented position shown in phantom.

Referring to the drawings, as shown in FIG. 1 the eyeglasses of the present invention include a first transparent member 10 having an outer edge 10a and an inner edge 10b and a second transparent member 11 having an outer edge 11a and an inner edge 11b affixed to nosepiece 12 on either side thereof at inner edges 10b and 11b to form a transparent member-nosepiece combination or assembly 13 adapted to be disposed in a desired plane in front of a user's eyes as clearly shown in solid lines in FIG. 3.

The transparent members can be any ophthalmic lens including plastic or glass, bifocals, trifocals or tinted lenses. Alternatively, simple sunglasses can be readily used. Naturally, plastic ophthalmic lenses are preferred since the greatest advantage is obtained thereby and the plastic is light-weight.

The nosepiece should preferably be a one-piece plastic member as shown in FIG. 1 since this is suitable for re-orientation with comfort to the user as described hereinabove. Metal or metal-plastic nosepieces are not preferred since they are fixed in their orientation and not suitable for comfortable adjustment by the user.

A first earpiece 20 is provided associated with the first transparent member 10 and a second earpiece 21 associated with the second transparent member 11. Earpieces 20 and 21 are configured to be disposed over and behind a respective ear of a user and have forward portions 20a and 21a extending in front of the ear and rearward portions 20b and 21b extending behind. A first suspension line 30 has both ends thereof 30a and 30b attached to first transparent member 10 at spaced apart points thereof and preferably disposed substantially at outer edge 10a. First suspension line 30 threadedly engages earpiece 20 at forward portion 20a thus running continuously from transparent member 10 to earpiece 20 and back to transparent member 10. Similarly, second suspension line 31 has both ends thereof 31a and 31b attached to second transparent member 11 at spaced apart points thereof and preferably disposed at outer edge 11a. Second suspension line 31 threadedly engages earpiece 21 at forward portion 21a thus running continuously from transparent member 11 to earpiece 21 and back to transparent member 11.

The continuous running of a single line from transparent member to earpiece and return with threaded engagement with the earpiece enables the user to comfortably re-orient the lenses by simple lens movement with the lenses retaining their re-orientation until moved back by the user and without the necessity for continued holding of the lenses by the user. This is clearly shown in FIG. 3 where the principal or optimum orientation is shown in solid lines and a suitable re-oriented position shown in phantom. Naturally, a variety of re-oriented positions can be used based on the needs of the user with virtually infinite adjustability possible. This versatility is not possible when separate lines are individually affixed to the earpieces.

The suspension lines are preferably a monofilament such as a six pound nylon monofilament or other suitable line such as a plastic material. When the eyeglasses are fitted to the user an elastic material is used for sizing and a suitable sized length of suspension line employed. Any suitable material can be used for the earpieces, although a strong, flexible plastic is preferred.

It is preferred to simply drill adjacent holes in the earpiece and thread the suspension lines therethrough, although other means may of course be employed for such threaded engagement. The ends of the suspension lines can simply be embedded in the lens with holes drilled therein, or secured therein by a pin. The points of attachment in the lens should be spaced apart as from 20 to 60 mm.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Eyeglasses comprising: a nosepiece; a first and second transparent member affixed to the nosepiece on opposite sides thereof to form a transparent member-nosepiece combination adapted to be disposed in a desired plane in front of a person's eyes; a first and second earpiece configured to be positioned over and behind a respective ear of the person; a first one piece suspension line having ends thereof attached to said first transparent member at spaced apart points and threadedly engaging said first earpiece running continuously from said first transparent member to said first earpiece and back to said first transparent member; and a second one piece suspension line having ends thereof attached to said second transparent member at spaced apart points and threadedly engaging said second earpiece running continuously from said second transparent member to said second earpiece and back to said second transparent member, wherein said suspension lines pass through said earpieces in a continuous uninterrupted manner, and wherein the desired plane of the transparent member-nosepiece combination can be fixedly altered by moving the transparent members and by changing the distance, from the transparent members to the earpieces, of each suspension line.

2. Eyeglasses according to claim 1 wherein the nosepiece is a one-piece, plastic member.

3. Eyeglasses according to claim 1 wherein the spaced apart points on the transparent members are disposed substantially at respective outer edges thereof.

4. Eyeglasses according to claim 3 wherein the spaced apart points are about 20–60 millimeters apart.

5. Eyeglasses according to claim 1 wherein said earpieces are flexible plastic.

6. Eyeglasses according to claim 1 wherein a portion of the earpieces extends in front of the ear and wherein said suspension lines threadedly engage said portion.

* * * * *